(12) United States Patent
Fenger (10) Patent No.: US 10,753,339 B2
(45) Date of Patent: Aug. 25, 2020

(54) ADJUSTABLE RETENTION FIXTURE FOR WIND TURBINE MEMBERS

(71) Applicant: LIFTRA IP APS, Aalborg SV (DK)

(72) Inventor: Per Eske Fenger, Terndrup (DK)

(73) Assignee: LIFTRA IP APS, Aalborg SV (DK)

( * ) Notice: Subject to any disclaimer, the term of this patent is extended or adjusted under 35 U.S.C. 154(b) by 7 days.

(21) Appl. No.: 16/330,520

(22) PCT Filed: Sep. 4, 2017

(86) PCT No.: PCT/EP2017/072093
§ 371 (c)(1),
(2) Date: Mar. 5, 2019

(87) PCT Pub. No.: WO2018/046436
PCT Pub. Date: Mar. 15, 2018

(65) Prior Publication Data
US 2019/0264657 A1  Aug. 29, 2019

(30) Foreign Application Priority Data

Sep. 8, 2016  (DK) .................................. 2016 00528

(51) Int. Cl.
*F03D 13/40*  (2016.01)
(52) U.S. Cl.
CPC .......... *F03D 13/40* (2016.05); *F05B 2260/02* (2013.01); *Y02E 10/72* (2013.01)
(58) Field of Classification Search
CPC ............. F03D 13/40; Y02E 10/72; B60P 3/40
USPC ......................................................... 410/44
See application file for complete search history.

(56) References Cited

U.S. PATENT DOCUMENTS

| 8,998,546 | B2 | 4/2015 | Fenger |
| 9,638,162 | B1* | 5/2017 | Fletcher ............... B61D 45/003 |
| 2010/0266420 | A1 | 10/2010 | Rasmussen et al. |
| 2011/0194896 | A1 | 8/2011 | Fenger |
| 2011/0255934 | A1 | 10/2011 | Delgado Matarranz et al. |
| 2012/0124833 | A1 | 5/2012 | Arendt et al. |
| 2013/0104376 | A1* | 5/2013 | Pedersen ................ B25B 11/00 29/525.02 |

(Continued)

FOREIGN PATENT DOCUMENTS

| EP | 2626547 A1 * | 8/2013 | ............. F03D 13/40 |
| WO | WO-2014154220 A1 * | 10/2014 | ............. F03D 13/40 |

*Primary Examiner* — Hilary L Gutman
(74) *Attorney, Agent, or Firm* — David S. Safran; Roberts Calderon Safran & Cole, P.C.

(57) ABSTRACT

A retention fixture for retaining a first end of a first member, such as a section of a wind turbine tower, a wind turbine rotor blade or a wind turbine hub, having an axial direction, a transverse direction perpendicular to the axial direction, and a vertical direction perpendicular to the axial and transverse directions. The transverse and vertical directions define a first plane. A first axial end console counteracts relative horizontal displacement between the first end of the first member and the retention fixture in the axial direction. The first axial end console also has transverse positioning means to transversely position the first end of the first member relative to the retention fixture when attaching the retention fixture to a first end of a first member. The transverse positioning means counteracts relative displacement between the first end of the first member and the retention fixture in the transverse direction.

10 Claims, 6 Drawing Sheets

(56) References Cited

U.S. PATENT DOCUMENTS

| | | |
|---|---|---|
| 2013/0119002 A1 | 5/2013 | Frederiksen |
| 2014/0353266 A1 | 12/2014 | Frederiksen |
| 2015/0308134 A1 | 10/2015 | Bjoemskov et al. |
| 2015/0369209 A1* | 12/2015 | Datta ............... F03D 13/40 211/85.8 |
| 2018/0111750 A1* | 4/2018 | Klein ............... B66C 1/108 |
| 2018/0178708 A1* | 6/2018 | Stuart ............... B60P 7/12 |

* cited by examiner

ADJUSTABLE RETENTION FIXTURE FOR WIND TURBINE MEMBERS

BACKGROUND OF THE INVENTION

Field of the Invention

The present invention relates to a retention fixture for retaining a first end of a first member, such as a section of a wind turbine tower, a wind turbine rotor blade or a wind turbine hub, the retention fixture comprising an axial direction, a transverse direction perpendicular to the axial direction, and a vertical direction perpendicular to both the axial direction and the transverse direction, wherein the transverse direction and the vertical direction define a first plane, a first axial end console adapted to counteract a relative horizontal displacement between the first end of the first member and the retention fixture in the axial direction. The first axial end console further comprises transverse positioning means configured to position the first end of the first member in relation to the retention fixture in the transverse direction, when attaching the retention fixture to a first end of a first member, and wherein the transverse positioning means are adapted to counteract a relative displacement between the first end of the first member and the retention fixture in the transverse direction.

The invention further relates to a method for mounting a retention fixture to a member, as well as a retention system for a member.

Description of the Related Art

In the field of retention fixtures, high demands on stability, strength and reliability are present during transportation of wind turbine members, such as a section of a wind turbine tower, a wind turbine rotor blade or a wind turbine hub. Therefore, there has been a tradition of building overly strong and overly sturdy retention fixtures. However, in recent years, an increased demand on space efficient transportation solutions has arisen, as transportation costs have become a business area which is of high importance, both for financial reasons, as well as the impact of worldwide transportation has on the environment. Thus, demand for more space efficient retention fixtures has increased. This has led to stackable systems, in which multiple wind turbine members can be retained in two levels. An example of such is found in International Patent Application Publication WO2010/012280A1 and correspond to U.S. Pat. No. 8,998, 546 B2, where a system of retention fixtures enables stacking two wind turbine tower sections during transportation.

However, over the years, as the wind turbine industry has developed, a larger variety of wind turbine members have become available, thus making custom made retention systems for each wind turbine member have become a cumbersome and costly task. Thus, a demand for an adjustable retention fixture and a flexible, customizable retention system has arisen.

SUMMARY OF THE INVENTION

It is an objective of the present invention to provide a retention fixture, by which it is possible to improve the problems of the prior art.

In a first aspect of the invention, these and further objects are obtain by a retention fixture of the kind mentioned in the introduction, which is further characterized in that the retention fixture further comprising a first set of at least two columns, detachably attached to the first axial end console, and extending in a direction substantially perpendicular to the axial direction at an angle between 45° and 135° in a first plane, where 90° is parallel to the vertical direction and 0° is parallel to the transverse direction, wherein the columns of the first set of at least two columns are movable in the transverse direction, and wherein the first axial end console comprises at least two attachment positions for each column, and wherein the retention fixture further comprises at least two rotatable axial fastening elements, said at least two axial fastening elements being adapted to be independently attached to the first end of the first member, while being positioned in relation to the first set of at least two columns, such that the columns are between the first end of the first member and the at least two rotatable axial fastening elements in the mounted state of the retention fixture, such that the at least two rotatable axial fastening elements counteract a relative horizontal displacement between the first end of the first member and the retention fixture in an axial direction.

There are several advantages to using a retention fixture of this type. One such advantage is that the retention fixture is adjustable to the shape and size of the member to which it is to be attached. Thus, a large variety of members can be retained using the same retention fixture. This both saves time as well as money for persons attempting to transport wind turbine members. When using retention fixtures according to the prior art, one has needed to have special parts, at least for some elements of the retention fixture, which are manufactured after the specifications of each wind turbine member. Thus, every time a new wind turbine member is to be transported using retention fixtures according to the prior art, a new retention fixture, or at least parts of the retention fixture, have to be manufactured. This process is rather time consuming, and allows for very limited changes in the design of the wind turbine members to be retained.

By using a retention fixture according to the first aspect of the invention, the manufacturing of the retention fixture is simplified and thus becomes more cost efficient, as the same construction and engineering design can be used for a wide variety of wind turbine members. Such members could be several different components, such as a section of a wind turbine tower, a wind turbine rotor blade or a wind turbine hub, but could also be several sections of a turbine tower, several sections of a wind turbine rotor blade, or other multi sectional parts. Most of the multi sectional part, such as a wind turbine tower, will often have differently sized sections, such as conical wind turbine tower sections, having one diameter at one end, and a different diameter at the other end. By using a retention fixture according to the first aspect of the invention, the retention fixture could be used at either end of the wind turbine tower, thus giving the user of the retention fixture greater freedom to fix the wind turbine member.

In an embodiment of the invention, the retention fixture is adapted to be attached to the first end of the first member, such that the axial direction of the retention fixture is parallel to the longitudinal direction of the first member. As such, the first axial end console is adapted to counteract a relative horizontal displacement between the first end of the first member and the retention fixture in the axial direction, which in this embodiment is parallel to the longitudinal direction of the first member. Further, the at least two rotatable axial fastening elements are adapted to counteract a relative horizontal displacement between the first end of the first member and the retention fixture in the axial direction, which in this embodiment is parallel to the longitudinal direction of the first member.

In another embodiment of the invention, the retention fixture is adapted to be attached to the first end of the first member, such that the axial direction of the retention fixture is perpendicular to first end of the first member. As such, the first axial end console is adapted to counteract a relative horizontal displacement between the first end of the first member and the retention fixture in the axial direction, which in this embodiment is perpendicular to first end of the first member. Further, the at least two rotatable axial fastening elements are adapted to counteract a relative horizontal displacement between the first end of the first member and the retention fixture in the axial direction, which in this embodiment is perpendicular to first end of the first member.

In yet another embodiment of the invention, the retention fixture is adapted to be attached to the first end of the first member, such that the axial direction of the retention fixture is perpendicular to first end of the first member as well as parallel to the longitudinal direction of the first member. As such, the first axial end console is adapted to counteract a relative horizontal displacement between the first end of the first member and the retention fixture in the axial direction, which in this embodiment is perpendicular to first end of the first member and parallel to the longitudinal direction of the first member. Further, the at least two rotatable axial fastening elements are adapted to counteract a relative horizontal displacement between the first end of the first member and the retention fixture in the axial direction, which in this embodiment is perpendicular to first end of the first member and parallel to the longitudinal direction of the first member.

In an embodiment of the invention, the first end of a first wind turbine member can be fixed using the retention fixture according to the first aspect of the invention, while the second end of the wind turbine member can be fixed using another type of retention fixture. By fixing the wind turbine member in this way, parts of an existing stock of retention fixtures can be used for retaining the member, as long as they fit the dimensions of one end of the first member. However, the retention fixture according to the first aspect of the invention provides an additional customization and flexibility, thus allowing the retention fixture to be attached to the first member, and thereby fixing the first member.

A further advantage of using a retention fixture according to the invention is that, when it comprises at least two rotatable axial fastening elements attached to the first end of the first member, such that the columns are positioned between the rotatable axial fastening elements so that the first end of the first member and the rotatable axial fastening elements counteract a relative horizontal displacement between the first end of the first member and the retention fixture in an axial direction perpendicular to the first end of the first member, the columns can be designed and manufactured in a manner which is independent of the attachment means of the first end of the first member. The least two rotatable axial fastening elements can be moved along the longitudinal direction of the columns, and can be rotated such that they can be fastened to the attachment means of the first end of the first member. Thus, the retention fixture is further adjustable to the different attachment means and locations of the wind turbine members to be retained.

In an embodiment of the first aspect of the invention, the rotatable axial fastening elements comprise fastening means, such as a bolt, for attaching to the first end of the first member. The rotatable axial fastening elements each further comprise a slot, in which the fastening means are positioned.

By having a slot for the fastening means to move in, the rotatable axial fastening elements can be moved and rotated in the first plane P, in order to adjust to the first end of the first member. The rotatable axial fastening elements are positioned adjacent to each of the columns of the first set of at least two columns, such that in the mounted state of the retention fixture, the fastening means of the rotatable fastening elements sandwich the columns of the first set of at least two columns between the rotatable axial fastening elements and the first end of the first member.

In another embodiment of the first aspect of the invention, the columns of the first set of at least two columns are preferably vertical.

By using columns which are aligned with the vertical direction, the retention fixture will be able to carry a greater load, than if the same columns were at an angle to the transverse direction in the first plane.

In an embodiment of the invention, for both embodiments with columns angled to the transverse direction in the first plane and in embodiments with columns parallel to the vertical direction, the columns are of a construction, where each column can be loaded on the top of the column by at least the weight of a quarter of the member which the retention fixture is configured to retain. Thus, the column has to at least withstand a force equivalent to a quarter of the gravitational force acting on a member to be retained. In a preferred embodiment, the columns can each be loaded by a force equivalent to at least the weight of half of the member which the retention fixture is configured to retain. In a more preferred embodiment, the columns can each be loaded by a force equivalent to at least the weight of half of the member which the retention fixture is configured to retain.

In an embodiment of the invention, the attachment positions are in the form of at least one slot in the first axial end console in the transverse direction, said at least one slot extending at least a part of the length of the first axial end console in the transverse direction.

An advantage of a retention fixture according to this embodiment is the increased flexibility in the configurations of the retention fixture, in order to be adapted to retain a higher number of wind turbine members, by making each column positionable independently of the others and movable along a length of the first axial end console. A further advantage of having a slot in the first axial end console, and being able to move the columns along the length of the slot, is that the retention fixture can be assembled around the wind turbine member which it is to retain.

In a further embodiment of the invention, the first axial end console comprises at least two slots extending at least a part of the length of the first axial end console in the transverse direction, said at least two slots forming the attachment positions are arranged in a number of rows of holes extending in the transverse direction, such that each attachment position can have several positions in parallel rows of slots.

In an embodiment of the invention, the attachment positions are in the form of a number of holes formed in the first axial end console, with a finite number of positions, wherein at least part of said holes extend at least partially in a transverse direction.

An advantage of this embodiment is that the first axial end console allows for a predefined number of positions for the columns, and as such the assembly of the retention fixture is simplified, as the person assembling the retention fixture does not have to align each column in the desired position from an infinite amount of positions, but only has to align each column with the corresponding holes in the first axial end console corresponding to the desired position.

In a further embodiment of the invention the holes forming the attachment positions are arranged in a number of transverse rows of holes, that each attachment position can consist of several holes placed in parallel rows of holes.

In an embodiment of the invention a second axial end console is attached to the top of the columns of the first set of at least two columns, wherein said second axial end console is adapted to counteract a relative horizontal displacement between a first end of a second member and the retention fixture in the axial direction, the second axial end console further comprising transverse positioning means configured to position the first end of the second member in relation to the retention fixture in the horizontal direction, transverse to the axial direction, when attaching the retention fixture to a first end of the second member, and wherein the transverse positioning means are adapted to counteract a relative displacement between the first end of the second member and the retention fixture in the horizontal direction, transverse to the axial direction.

An advantage of the retention fixture according to this embodiment of the invention is that the wind turbine members to be retained can be stacked in the vertical direction, such as to transport several wind turbine members simultaneously without taking up more area in the horizontal plane defined by the axial and transverse directions. This is highly advantageous when transporting over long distances, as most shipping, whether by land or by sea, are sensitive to the horizontal area taken up by the transported goods, and often more sensitive to the horizontal area than to the height of the transported goods. Therefore, a retention fixture according to this embodiment of the invention allows for more space efficient transportation of the wind turbine members, and therefore, also more cost efficient transportation.

In a preferred embodiment of the invention, the second axial end console is identical to the first axial end console. This is advantageous for both manufacturing purposes, as the number of different component designs is reduced, as well as for the person assembling the retention fixture, as there is no need to mark the different axial end consoles, and as they can easily be interchanged, without a change in the function of the axial end consoles or the retention fixture as a whole.

In further embodiment of the invention, the retention fixture further comprises a second set of at least two columns, detachably attached to said second axial end console, and extending in a direction substantially perpendicular to the axial direction and at an angle between 45° and 135° relative to the transverse direction in the first plane, wherein the columns of said second set of at least two columns are movable in the transverse direction, and wherein the second axial end console comprises at least two attachment positions for each column of said second set of at least two columns.

An advantage of the retention fixture comprising a second set of at least two columns according to this embodiment of the invention is that the wind turbine members to be retained can be stacked in the vertical direction, with more than two levels. This is a further advantage, as this allows for even more space efficient transportation of the wind turbine members, and therefore also more cost efficient transportation.

In a preferred embodiment of the invention, the columns of the second set of at least two columns and the columns of the first set of at least two columns are all identical. This is advantageous for both manufacturing purposes, as the number of different component designs is reduced, as well as for the person assembling the retention fixture, as there is no need to mark the columns, and as they can easily be interchanged, without a change in the function of the function or load bearing capacity of the columns, or of the retention fixture as a whole.

In another embodiment of the invention, having a second set of at least two columns, the columns of said second set of at least two columns are positioned at a distance in the transverse direction from the columns of the first set of at least two columns.

This is advantageous as it allows for wind turbine members of different shapes and/or sizes to be retained in the different levels of the retention fixture.

In a further embodiment of the invention, the distance at which the columns of the second set of at least two columns are positioned in the transverse direction from the columns of the first set of at least two columns is at least the width of the columns of the first set of at least two columns.

In an embodiment of the invention at least one axial fastening device is adapted to be attached between the first and/or second axial end console and a portion of the first and/or second member, respectively, in the axial direction.

An advantage of this is that the retention fixture can further fix the wind turbine member in the axial direction. This is especially effective in the axial direction from the first end of the member moving away from the first and/or second axial end console, where the fastening device limits the relative movement of the member in the axial direction away from the first and/or second axial end console. In a further embodiment, the fastening device comprises a bolt. By using a fastening device comprising a bolt, the bolt holes present in most wind turbine member can be used for attachment of the first and/or second axial end console of the retention fixture. The advantage of the retention fixture comprising a fastening device adapted to attach the first and/or second axial end console to a portion of the member, is further advantageous when the retention fixture is used in transport situations, where the retention fixture and the wind turbine member it retains experience high accelerations, such as those experienced when transporting wind turbine members on trains or ships.

In another embodiment of the first aspect of the invention, the retention fixture further comprises rotational and transverse holding means adapted to counteract a relative rotation, such as a roll, of the first end of the first and/or second member and counteract a relative displacement between the first end of the first and/or second member and the retention fixture in the transverse direction.

In a further embodiment of the invention, the rotational and transverse holding means are attached at each end of the first and/or second axial end console at one end of the rotational and transverse holding means and wherein the other end of the rotational and transverse holding means are adapted to be attached to the first end of the first and/or second member, respectively.

In an embodiment of the first aspect of the invention, a base of the first axial console, adapted to be attached to a foundation or a floor of the transportation vehicle, is not parallel with the axial direction. A base of the first axial console not being parallel with the axial direction can compensate for conical, or otherwise alternatively shaped, members attached to the retention fixture. In a further embodiment, a base of the second axial console has a different angle to the axial direction than the base of the first axial console. This allows for variations in shape and orientation of the members to be retained, while enabling stacking in the vertical direction.

A second aspect of the invention provides a method for transporting a member of a wind turbine, such as a section of a wind turbine tower, a wind turbine rotor blade or a wind turbine hub, by using a retention fixture according to the first aspect of the invention, said retention fixture having an axial direction, a transverse direction being perpendicular to the axial direction, and a vertical direction being perpendicular to both the axial direction and the transverse direction, and wherein the transverse direction and the vertical direction define a first plane, wherein said method comprises the steps of:

a) placing a first end of a first member on transverse positioning means of a first axial end console, and positioning the first end of the first member in the transverse and vertical directions, b) attaching a first end of a first member to a first axial end console, c) attaching a first set of at least two columns to said first axial end console in an attachment position of said first axial end console, the columns of said first set of at least two columns each extending in a direction substantially perpendicular to the axial direction and at an angle between 45° and 135° relative to the transverse direction in the first plane, where 90° is parallel to the vertical direction, d) attaching at least two rotatable axial fastening elements to the first end of the first member, by placing the rotatable axial fastening elements adjacent to each of the columns of the first set of at least two columns, such that the columns are positioned between the rotatable axial fastening elements and the first end of the first member, such that the rotatable axial fastening elements counteract a relative horizontal displacement between the first end of the first member and the retention fixture in an axial direction perpendicular to the first end of the first member.

In an embodiment according to the second aspect of the invention, the method further comprises the steps of:

attaching a second axial end console to the top of the first set of at least two columns, and placing a first end of a second member on transverse positioning means of a second axial end console, and positioning the first end of the second member in the transverse and vertical directions, and attaching a first end of a first member to a first axial end console.

In a further embodiment of the second aspect of the invention, the method further comprises the steps of:

attaching a second set of at least two columns to said second axial end console in an attachment position of said second axial end console, the columns of said second set of at least two columns each extending in a direction substantially perpendicular to the axial direction and at an angle between 45° and 135° relative to the transverse direction in the first plane, where 90° is parallel to the vertical direction, and attaching at least two rotatable axial fastening elements to the first end of the second member, by placing the rotatable axial fastening elements adjacent to each of the columns of the second set of at least two columns, such that the columns are positioned between the rotatable axial fastening elements and the first end of the second member, such that the rotatable axial fastening elements counteract a relative horizontal displacement between the first end of the second member and the retention fixture in an axial direction perpendicular to the first end of the second member.

A third aspect of the invention provides a retention system wherein at least two retention fixtures according to any of the embodiments according to the first aspect of the invention are positioned at each end of a member, such as a section of a wind turbine tower, a wind turbine rotor blade or a wind turbine hub.

The invention will be described in more detail below by means of non-limiting examples of presently preferred embodiments and with reference to the accompanying schematic drawings.

DETAILED DESCRIPTION OF THE INVENTION

Figure 1:
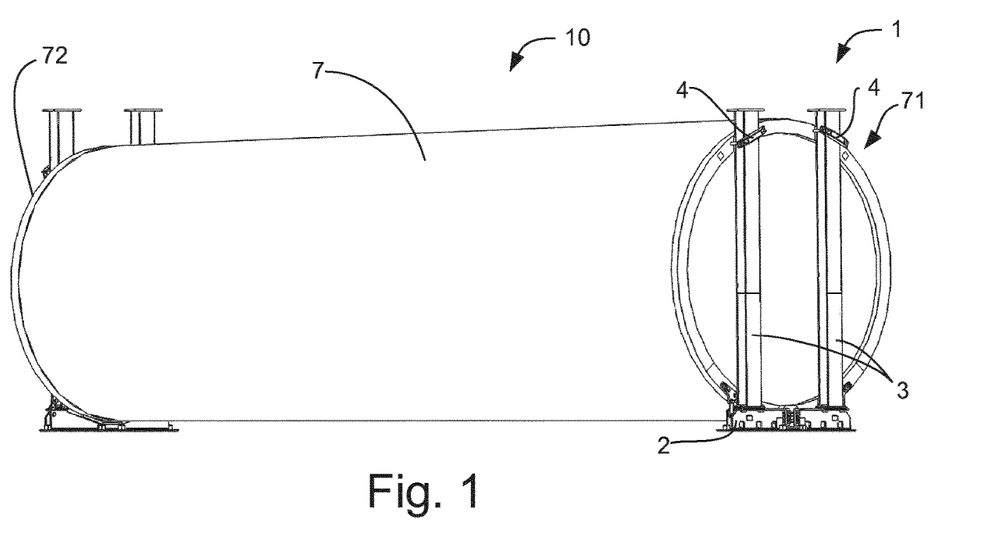
FIG. 1 shows a perspective view of an embodiment according to the invention.

FIG. 1 shows a perspective view of a retention system 10 according to an embodiment of the invention, used for transportation of wind turbine members 7. In FIG. 1, a section of a wind turbine tower 7 is shown. This could be any number of large wind turbine members 7, such as a rotor blade, a section of a rotor blade, a rotor hub, a nacelle, etc. The tower section is retained at both a first end 71 and a second end 72 of the tower section 7 by a retention fixture 1 according to any embodiment of the invention. The retention fixture 1 at each end of the tower section 7 could be according to different embodiments of the invention, or could be identical retention fixtures 1. At the first end 71 of the tower section 7, a retention fixture 1 is located, comprising a first axial end console 2 which is fixed to a support surface. Further attached to the axial end console 2 is a first set of two columns 3 and two rotatable axial fastening elements 4, which are attached to the tower section 7.

Figure 2A:
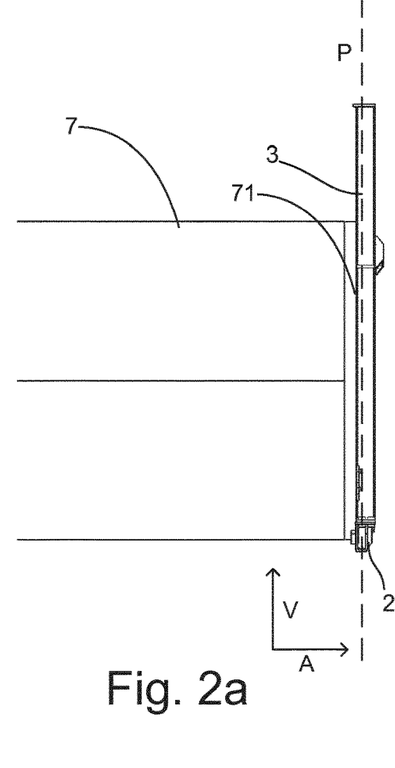
FIG. 2a shows a side view of an embodiment according to the invention.

FIG. 2a shows a side view of the of the retention system 10 shown on FIG. 1, where the first end 71 of the tower section 7 is seen. The axial direction A is shown in this embodiment as being perpendicular to first end 71 of the tower section. The vertical direction V is also shown as extending perpendicular to the axial direction A, which in this embodiment is parallel to the first end 71 of the tower section 7.

Figure 2B:
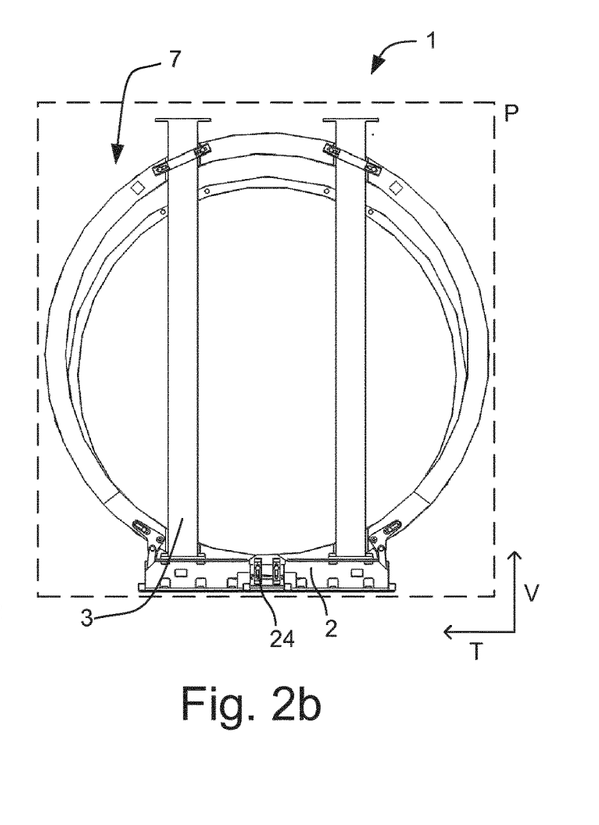
FIG. 2b shows an end view of an embodiment according to the invention.

FIG. 2b shows an end view of the of the retention system 10 shown on FIGS. 1 and 2a. The transverse direction T is shown as being perpendicular to the axial direction A and the vertical direction V. Further, in FIGS. 2a and 2b, the first plane P is shown as extending between the transverse direction T and the vertical direction V. The columns 3 extend from the axial end console 2 at an angle of 90° in the first plane P with regard to the transverse direction T in this embodiment. This is equivalent to extending in the vertical direction V.

Figure 3A:
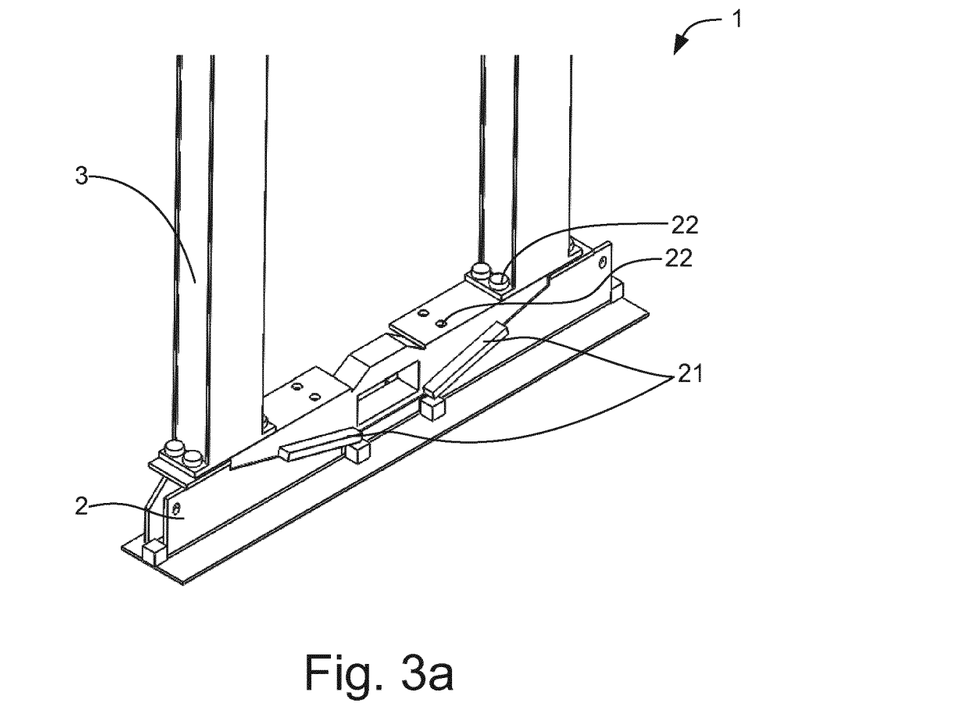
FIG. 3a shows a detailed perspective view of an embodiment according the invention.

FIG. 3a shows a perspective view of the side of the retention fixture 1, which faces towards the wind turbine member 7 to be retained. In FIG. 3a, transverse positioning means 21 are seen extending from the axial end console 2 towards the wind turbine member 7. In this embodiment, the transverse positioning means 21 comprise angled bars, being angled relative to the transverse direction T, such that when the first end 71 of the first member 7 is placed on the transverse positioning means 21, the gravitational force acting on the first member 7 and the normal forces of the transverse positioning means 21, will guide the first end 71 of the member into the correct position. The transverse positioning means 21 could be of any shape, which has a slope towards the desired fixing position of the first end 71 of the first member 7. Thus the shape could also be curved, or could consist of a number of different sloped bars, such as to increase or decrease the guidance effect of the gravitational and normal forces.

FIG. 3a further shows the columns 3 being attached to the first axial end console 2 in an attachment position 22. In the embodiment shown, there is a further attachment position 22 towards the center of the first axial end console 2. This further attachment position could be used for smaller members 7.

Figure 3B:
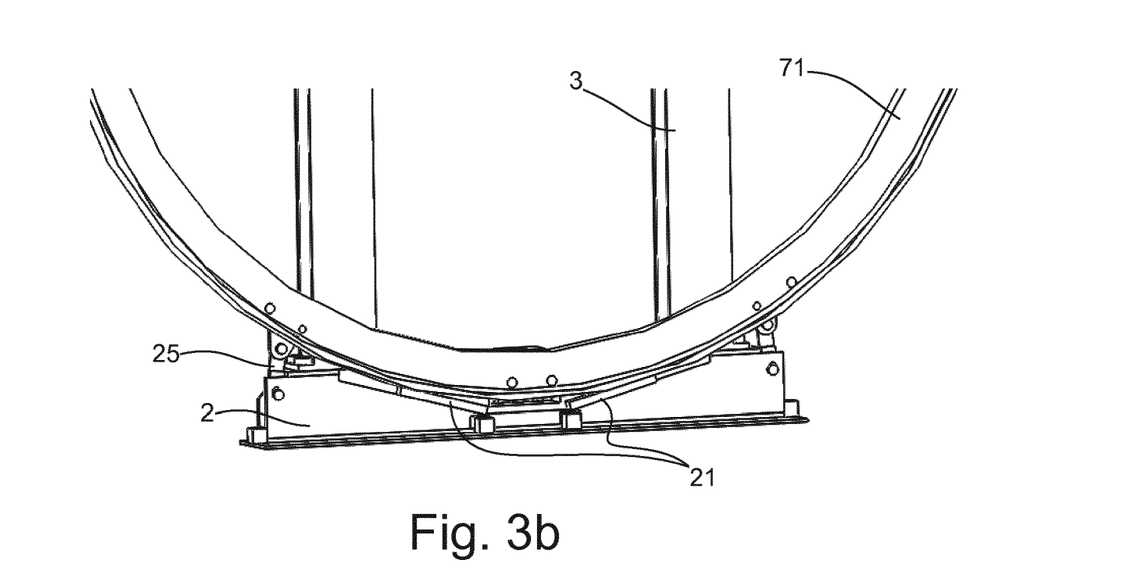
FIG. 3b shows a detailed perspective view of an embodiment according the invention.

As shown on FIG. 3b, the transverse positioning means 21 further are configured to counteract a relative displacement between the first end 71 of the tower section 7 and the retention fixture 1 in the transverse direction T, when the first end 71 is mounted in the retention fixture. If the tower section 7 is pushed in the transverse direction T, the normal forces of the transverse positioning means 21 will resist a relative displacement between the first end 71 of the tower section 7 and the retention fixture 1 in the transverse direction T. If however a relative displacement between the first end 71 of the tower section 7 and the retention fixture occurs, the slope of the transverse positioning means further acts as a gravitational guide, as the gravitational force will force the first end 71 of the tower section 7 back to the desired position.

In order to further retain the first end 71 of the tower section 7 in the desired position in the transverse positioning means 21, the retention fixture 1 comprises rotational and transverse holding means 25, configured to counteract a rotation of the tower section 7 and a relative displacement of the first end 71 in relation to the retention fixture 1 in the transverse direction T. In the embodiment shown, the rotational and transverse holding means 25 are in the form of a steel bar, but could be anything which can provide a tensional stiffness or a compressive stiffness, such as a turnbuckle, a wedge or block.

Figure 4A:
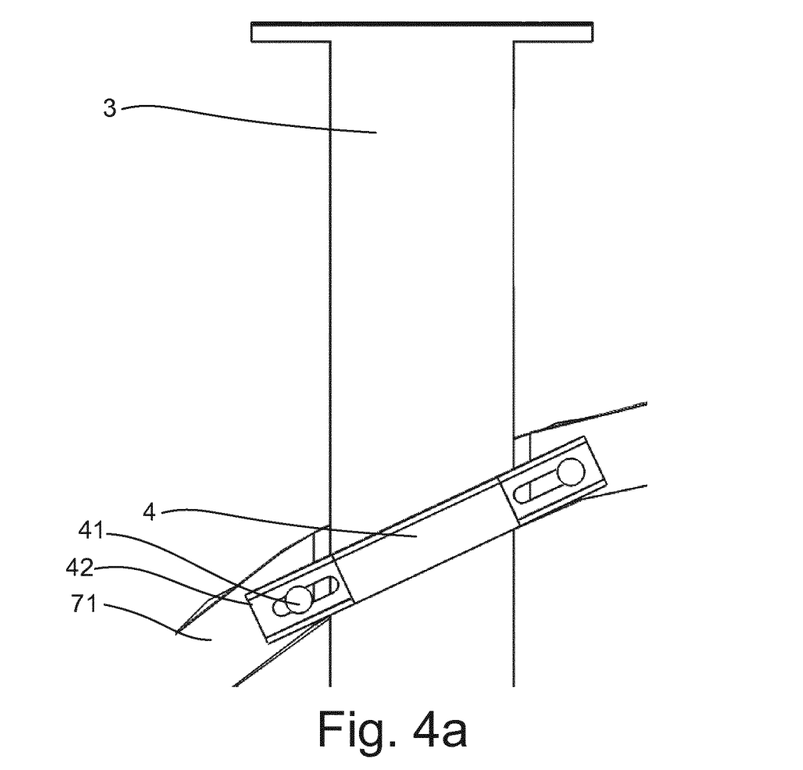
FIGS. 4a and 4b show detailed perspective views of an embodiment according the invention.
Figure 4B:
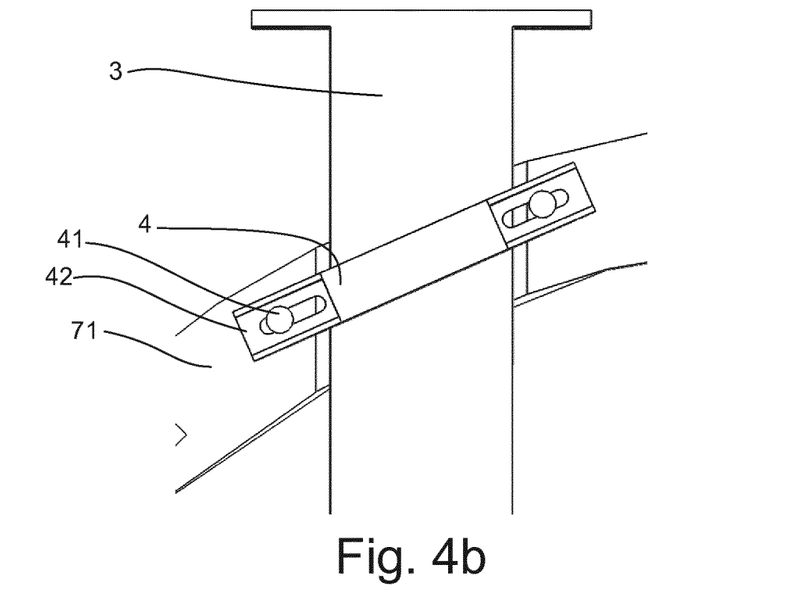

FIGS. 4a and 4b show the attachment of a rotatable axial fastening element 4 which in the embodiment shown comprises two bolts 41 for attaching to the first end 71 of the tower section 7. The rotatable axial fastening element 4 comprises two slots 42, in which the bolts 41 are positioned. By having a slot 42 for the bolt 41 to move in, the rotatable axial fastening element can be moved and rotated in the first plane P, in order to adjust to the bolt holes in the first end 71 of the tower section 7. The rotatable axial fastening element 4 is positioned adjacent to the column 3, such that in the mounted state of the retention fixture 1, the tension of the bolt 41 sandwiches the column between the rotatable axial fastening elements 4 and the first end 71 of the tower section 7.

Figure 5A:
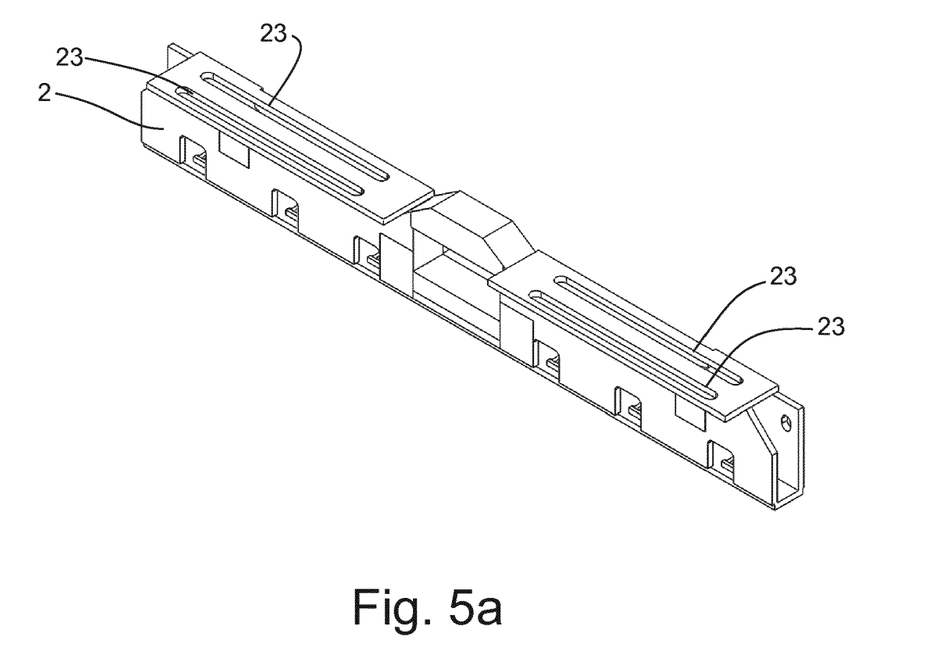
FIG. 5a shows a perspective view of an axial end console according to an embodiment of the invention.

FIG. 5a shows an axial end console 2 according to an embodiment of the invention, wherein the attachment positions 22 are in the form of slots 23 extending in the transverse direction T. As seen in FIG. 5a, the slots 23 each extend over a part of the length of the axial end console 2, and are arranged in two parallel rows. Therefore, the columns 3 can be attached at any location along the length of the slots 23. When attaching the columns 3, the fastening means, such as a bolt, attaching the column 3 to the axial end console 2 can be partially fastened, thus allowing for adjustments of the column 3 position along the length of the axial end console 2. When the column is in its final position, the fastening means can be fully fastened.

Figure 5B:
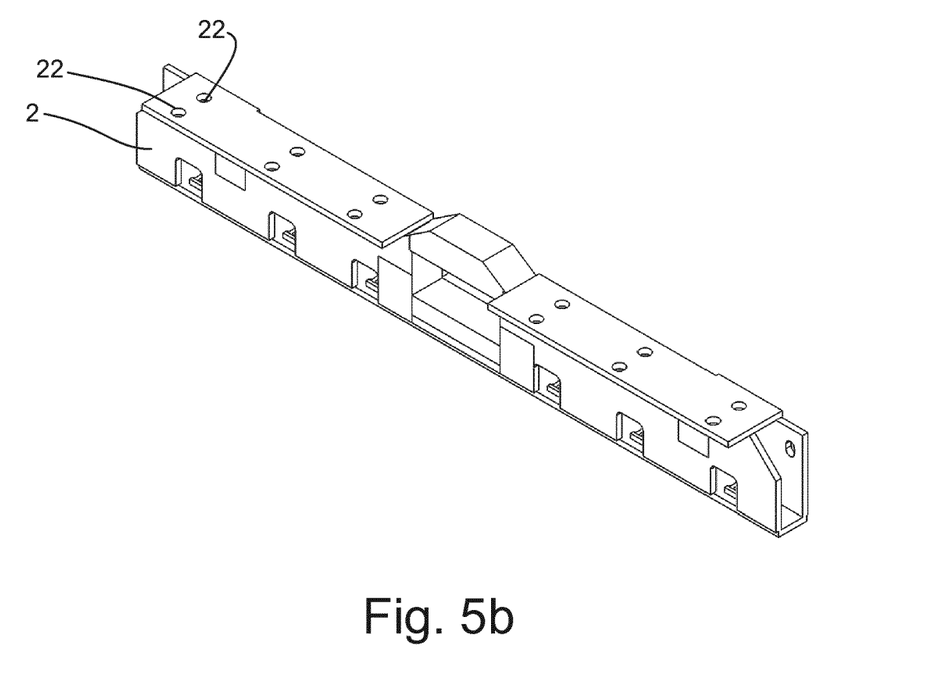
FIG. 5b shows a perspective view of an axial end console according to another embodiment of the invention.

FIG. 5b shows an axial end console 2 according to an embodiment of the invention, wherein the attachment positions 22 are in the form of two rows of holes 22 extending in the transverse direction T. The holes 22 seen in FIG. 5b are not threaded, but they could just as well be threaded. The columns 3 can be attached at one of the predetermined attachment positions 22 along the length of the axial end console 2. When attaching the columns 3, the user does not need to measure and position the columns 3 as carefully, as the attachment positions 22 are determined beforehand. This makes assembly of the retention fixture much simpler.

Figure 6:
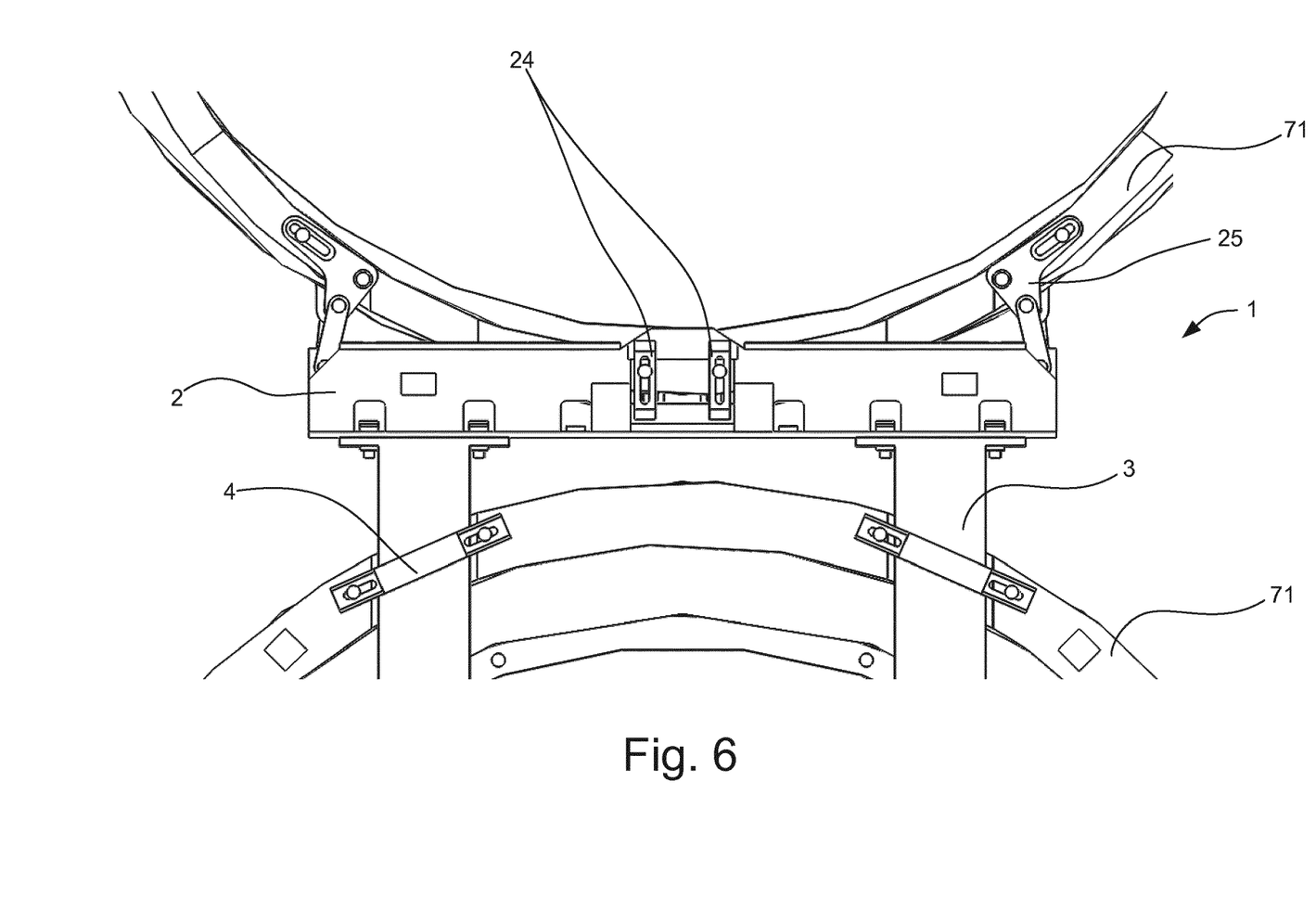
FIG. 6 shows an end view of an embodiment according to the invention having a second axial end console.

FIG. 6 shows an embodiment of the invention wherein a second axial end console 2 is attached to the top of the columns 3. In the embodiment shown, this second axial end console 2 is identical to the first axial end console. Thus, manufacturing and assembly of the retention fixture 1 is simplified. A first end 71 of a second tower section 7 is seen mounted to the second axial end console 2 of the retention fixture 1. Additionally, rotational and transverse holding means 25 are seen extending from the second axial end console 2 to the first end 71 of the second tower section 7, in order to counteract a rotation of the second tower section 7 and a relative displacement of the first end 71 of the second tower section 7 in relation to the retention fixture 1 in the transverse direction T.

As also shown in FIG. 2b, the retention fixture 1 further comprises two axial fastening devices 24, for fastening the axial end console 2 to a part of the tower section 7. These axial fastening devices 24 further fix the tower section in the axial direction. In the embodiment shown, the axial fastening devices comprise a bolt, such that the axial fastening devices 24 is attached to a bolt hole present in the first end 71 of the tower section 7.

Figure 7A:
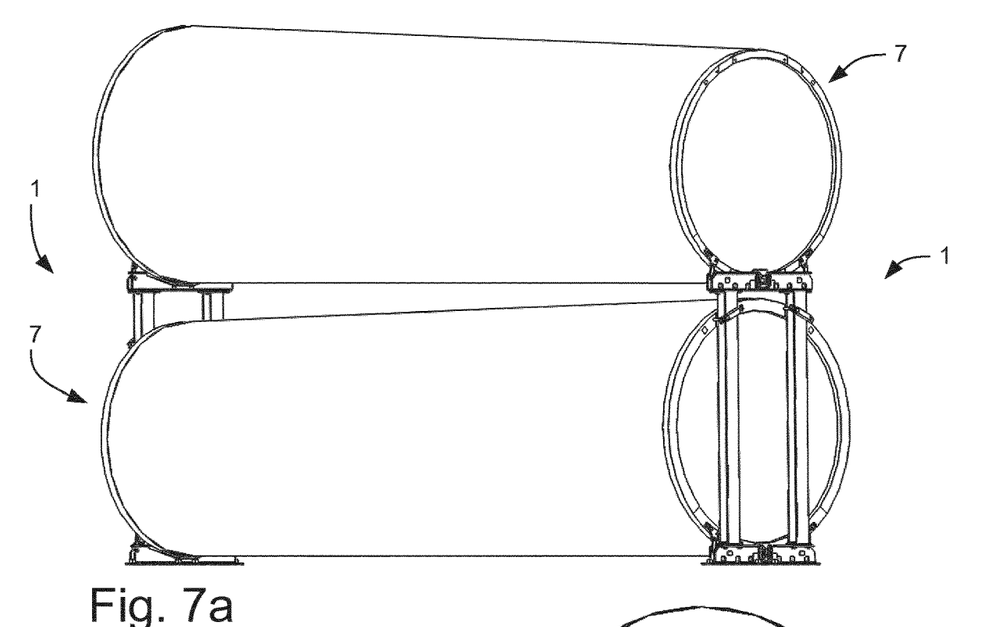
FIG. 7a shows a perspective view of an embodiment according to the invention having a second axial end console.
Figure 7B:
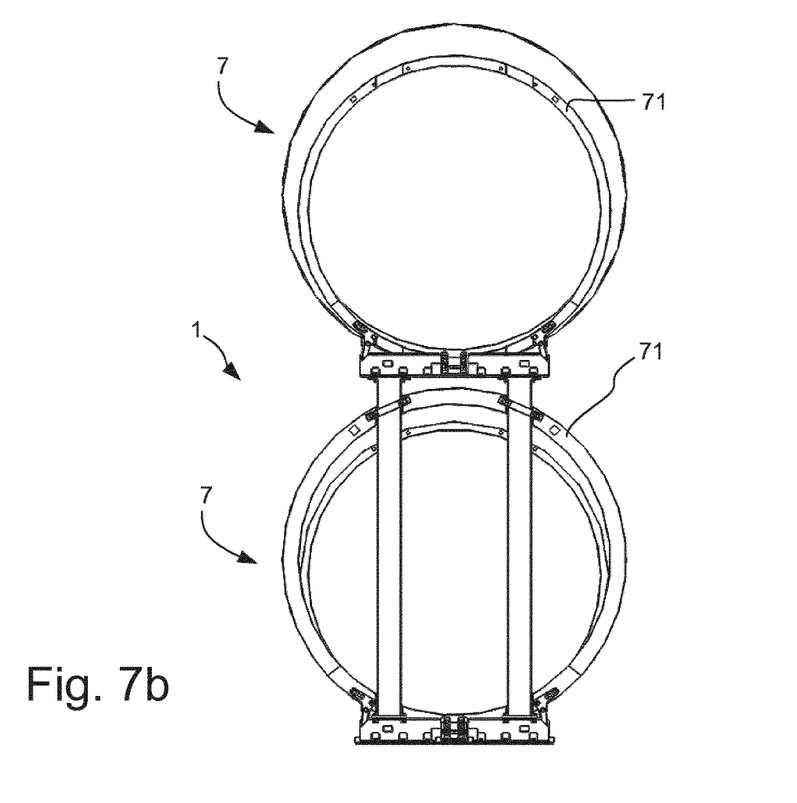
FIG. 7b shows a side view of an embodiment according to the invention having a second axial end console.

FIGS. 7a and 7b show an embodiment of a retention system 10 according to the third aspect of the invention, wherein the retention system 10 comprises two retention fixtures 1, having two retention levels for retaining two wind turbine tower sections 7, the retention levels being defined by the retention fixtures 1 having two axial end consoles 2 for retaining the ends of the tower section 7.

The invention claimed is:

1. A retention fixture for retaining a first end of a first member of the type comprising a section of a wind turbine tower, a wind turbine rotor blade or a wind turbine hub, said retention fixture comprising an axial direction, a transverse direction perpendicular to the axial direction, and a vertical direction perpendicular to both the axial direction and the transverse direction, wherein the transverse direction and the vertical direction define a first plane, a first axial end console adapted to counteract a relative horizontal displacement between the first end of the first member and the retention fixture in the axial direction, said first axial end console further comprising transverse positioning means configured to position the first end of the first member in relation to the retention fixture in the transverse direction, when attaching the retention fixture to the first end of the first member, wherein said transverse positioning means are adapted to counteract relative transverse displacement between the first end of the first member and the retention fixture in the transverse direction, wherein said retention fixture further comprises a first set of at least two columns, detachably attached at a bottom end to said first axial end console, and extending in a direction substantially perpendicular to the axial direction and at an angle between 45° and 135° in the first plane, where 90° is parallel to the vertical direction and 0° is parallel to the transverse direction, wherein the columns of said first set of at least two columns are movable in the transverse direction, and wherein the first axial end console comprises at least two attachment positions for each column, and wherein said retention fixture further comprises at least two rotatable axial fastening elements, said at least two axial fastening elements being adapted to be independently attached to the first end of the first member, while being positioned in relation to the first set of at least two columns, such that the columns are between the first end of the first member and the at least two rotatable axial fastening elements in a mounted state of the retention fixture, such that the at least two rotatable axial fastening elements counteract the relative horizontal displacement between the first end of the first member and the retention fixture in the axial direction.

2. The retention fixture according to claim 1, wherein the columns of said set of at least two columns are aligned in the vertical direction.

3. The retention fixture according to claim 1, wherein the attachment positions are in the form of at least one slot in the first axial end console extending in the transverse direction along at least a part of the length of the first axial end console.

4. The retention fixture according to claim 1, wherein the attachment positions are in the form of a number of holes formed in the first axial end console in a finite number of positions, wherein at least part of said holes extend at least partially in the transverse direction.

5. The retention fixture according claim 1, wherein a second axial end console is attached to the top of the columns of the first set of at least two columns, wherein said second axial end console is adapted to counteract a relative horizontal displacement between a first end of a second member and the retention fixture in the axial direction, wherein said second axial end console further comprising transverse positioning means configured to position the first end of the second member in relation to the retention fixture in the transverse direction, when attaching the retention fixture to the first end of the second member, wherein said transverse positioning means are adapted to counteract a relative transverse displacement between the first end of the second member and the retention fixture in the transverse direction.

6. The retention fixture according to claim 5, wherein said retention fixture further comprises a second set of at least two columns, detachably attached to said second axial end console, and extending in a direction substantially perpendicular to the axial direction and at an angle between 45° and 135° relative to the transverse direction in the first plane, wherein the columns of said second set of at least two columns are movable in the transverse direction, and wherein the second axial end console comprises at least two attachment positions for each column.

7. The retention fixture according to claim 6, wherein the columns of the second set of at least two columns are positioned at a distance in the transverse direction from the columns of the first set of at least two columns.

8. The retention fixture according to claim 1, wherein at least one axial fastening device is adapted to be attached between at least one of said first or second axial end console and a portion of at least one of the first or second member, respectively, in the axial direction.

9. A method for retaining a first member of a wind turbine of the type comprising a section of a wind turbine tower, a wind turbine rotor blade or a wind turbine hub, by using a retention fixture having an axial direction, a transverse direction being perpendicular to the axial direction, and a vertical direction being perpendicular to both the axial direction and the transverse direction, and wherein the transverse direction and the vertical direction define a first plane, a first axial end console adapted to counteract a relative horizontal displacement between the first end of the first member and the retention fixture in the axial direction, said first axial end console further comprising transverse positioning means configured to position the first end of the first member in relation to the retention fixture in the transverse direction, when attaching the retention fixture to the first end of the first member, wherein said transverse positioning means are adapted to counteract relative transverse displacement between the first end of the first member and the retention fixture in the transverse direction, wherein said retention fixture further comprises a first set of at least two columns, detachably attached to said first axial end console, and extending in a direction substantially perpendicular to the axial direction and at an angle between 45° and 135° in the first plane, where 90° is parallel to the vertical direction and 0° is parallel to the transverse direction, wherein the columns of said first set of at least two columns are movable in the transverse direction, and wherein the first axial end console comprises at least two attachment positions for each column, and wherein said retention fixture further comprises at least two rotatable axial fastening elements, said at least two axial fastening elements being adapted to be independently attached to the first end of the first member, while being positioned in relation to the first set of at least two columns, such that the columns are between the first end of the first member and the at least two rotatable axial fastening elements in a mounted state of the retention fixture, such that the at least two rotatable axial fastening elements counteract the relative horizontal displacement between the first end of the first member and the retention fixture in the axial direction wherein said method comprises the steps of:

a) placing the first end of the first member on the transverse positioning means of the first axial end console, and positioning the first end of the first member in the transverse and vertical directions, b) attaching a first end of the first member to the first axial end console,
c) attaching the first set of at least two columns to said first axial end console in the attachment position of said first axial end console, the columns of said first set of at least two columns each extending in a direction substantially perpendicular to the axial direction and at the angle between 45° and 135° to the transverse direction in the first plane, where 90° is parallel to the vertical direction,
d) attaching the at least two rotatable axial fastening elements to the first end of the first member, by placing the rotatable axial fastening elements adjacent to each of the columns of the first set of at least two columns, such that the columns are positioned between the rotatable axial fastening elements and the first end of the first member, so that the rotatable axial fastening elements counteract the relative horizontal displacement between the first end of the first member and the retention fixture in the axial direction perpendicular to the first end of the first member.

10. A retention system, comprising at least two retention fixtures each of which is positioned mounted at a respective end of at least one first member, and wherein each of the retention fixtures comprises:
   an axial direction, a transverse direction perpendicular to the axial direction, and a vertical direction perpendicular to both the axial direction and the transverse direction, wherein the transverse direction and the vertical direction define a first plane,
   a first axial end console adapted to counteract a relative horizontal displacement between the first end of the first member and the retention fixture in the axial direction,
   said first axial end console further comprising transverse positioning means configured to position the first end of the first member in relation to the retention fixture in the transverse direction, when attaching the retention fixture to the first end of the first member, wherein said transverse positioning means are adapted to counteract relative transverse displacement between the first end of the first member and the retention fixture in the transverse direction,
   wherein said retention fixture further comprises a first set of at least two columns, detachably attached to said first axial end console, and extending in a direction substantially perpendicular to the axial direction and at an angle between 45° and 135° in the first plane, where 90° is parallel to the vertical direction and 0° is parallel to the transverse direction,
   wherein the columns of said first set of at least two columns are movable in the transverse direction, and wherein the first axial end console comprises at least two attachment positions for each column, and
   wherein said retention fixture further comprises at least two rotatable axial fastening elements, said at least two axial fastening elements being adapted to be independently attached to the first end of the first member, while being positioned in relation to the first set of at least two columns, such that the columns are between the first end of the first member and the at least two rotatable axial fastening elements in a mounted state of the retention fixture, such that the at least two rotatable axial fastening elements counteract the relative horizontal displacement between the first end of the first member and the retention fixture in the axial direction.

* * * * *